United States Patent [19]

Stolarczyk et al.

[11] Patent Number: 5,072,172
[45] Date of Patent: Dec. 10, 1991

[54] METHOD AND APPARATUS FOR MEASURING THE THICKNESS OF A LAYER OF GEOLOGIC MATERIAL USING A MICROSTRIP ANTENNA

[75] Inventors: Larry G. Stolarczyk; Gerald L. Stolarczyk; David L. Baldridge, all of Raton, N. Mex.

[73] Assignee: Stolar, Inc., Raton, N. Mex.

[21] Appl. No.: 400,351

[22] Filed: Aug. 30, 1989

[51] Int. Cl.⁵ .......................... G01V 3/08; G01V 3/10; G01V 3/12; G01R 27/04
[52] U.S. Cl. ................................ 324/332; 324/635; 324/644
[58] Field of Search .............. 324/332, 633, 635, 637, 324/644; 343/700 MS; 299/1

[56] References Cited

U.S. PATENT DOCUMENTS 4,623,835 11/1986 Mehdizadch et al. .............. 324/644

OTHER PUBLICATIONS

Hansen et al., "Input Inpedance and Mutal Coupling of Rectangular Microstrip Patch Antennas with a Dielectric Cover", 1986 Microwaves Enbitions and Publishers Ltd., pp. 360–365.

Chang et al., "An Analysis of a Resonant Loop as an Electromagnetic Sensor of Coal Seam Thickness", Proceedings of URSI Conference on Propagation in Non Ionized Media, 5/1977, pp. 1–6.

Primary Examiner—Walter E. Snow
Attorney, Agent, or Firm—Thomas E. Schatzel

[57] ABSTRACT

A method of determining the thickness of a layer of material, such as soil, wood, ice or coal, that utilizes a microstrip antenna as a thickness measuring sensor. The sensor is positioned over the layer and a value for a parameter of the antenna such as conductance or resonant frequency is measured. The value is compared to a calibration table of values and the thickness of the layer is determined by interpolation. Alternatively, the value is compared to a control value to initiate a decision process. The decision could be that a layer of ice is building up on a wing of an aircraft or that an explosive device is buried under a layer of soil.

17 Claims, 4 Drawing Sheets

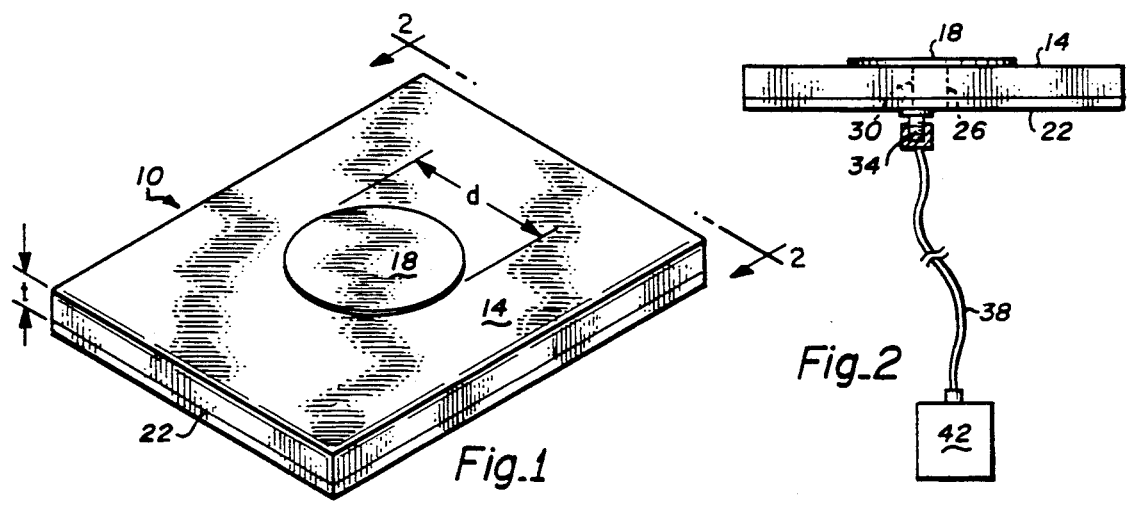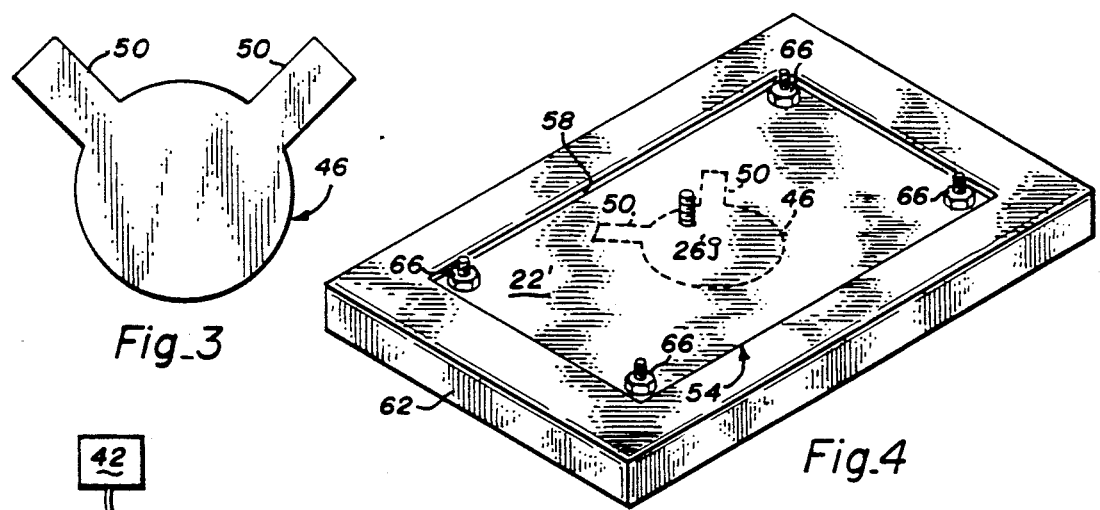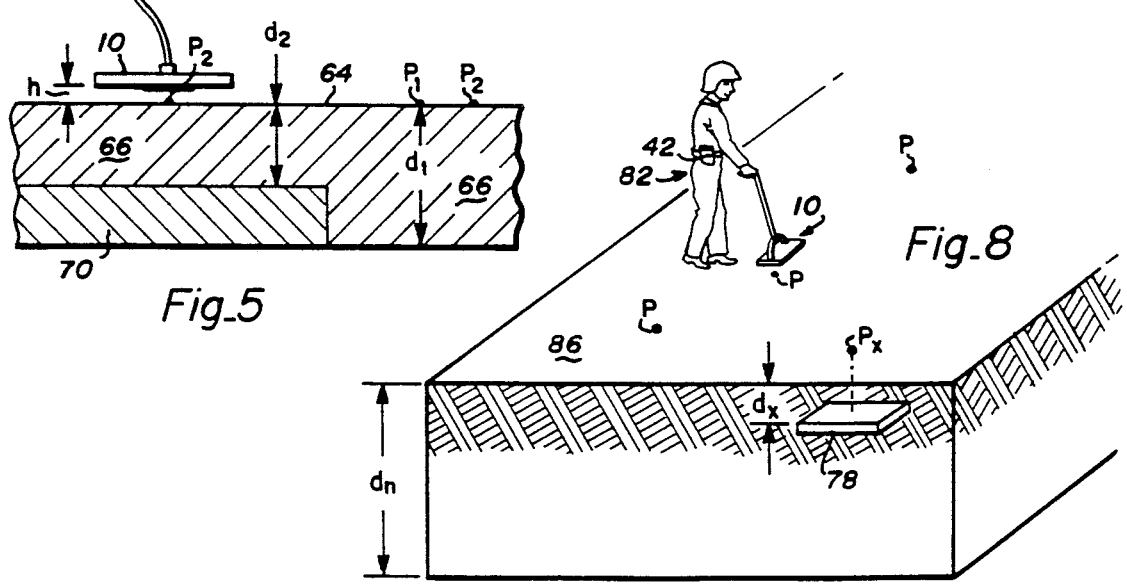

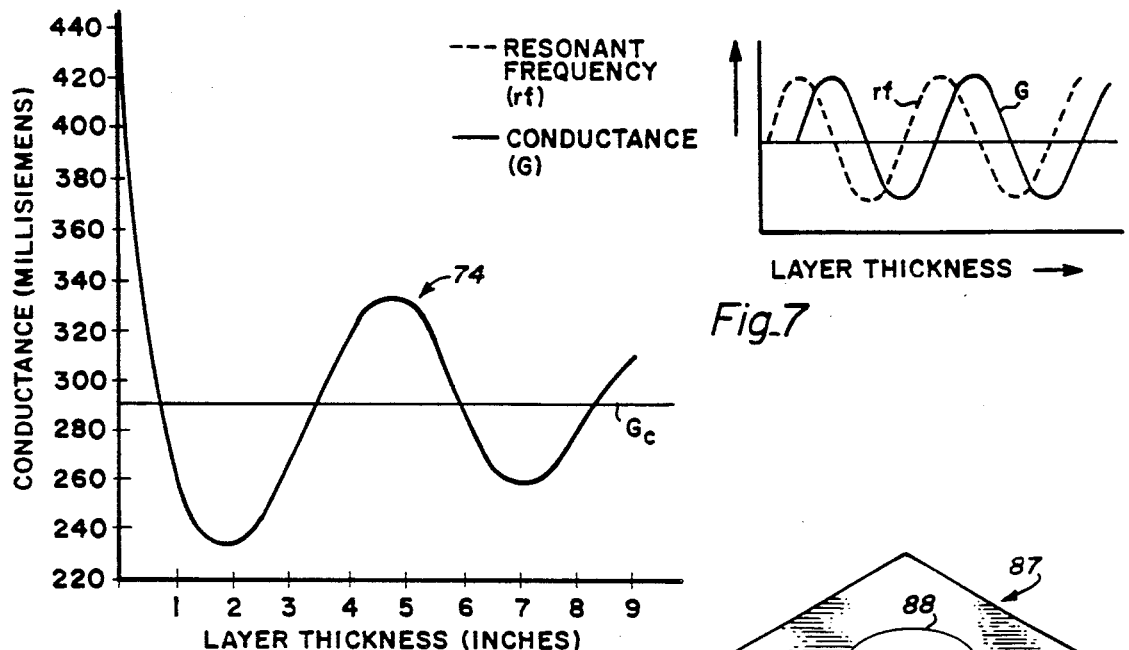
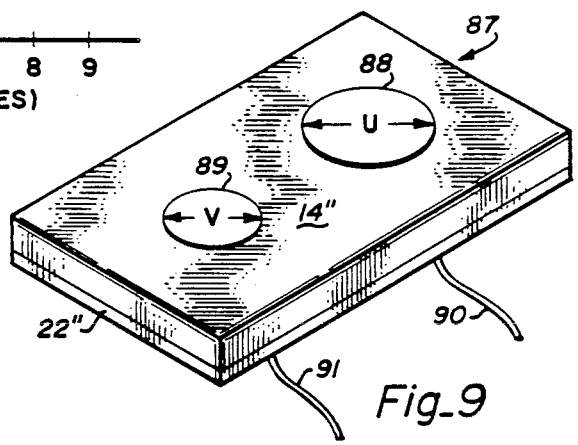
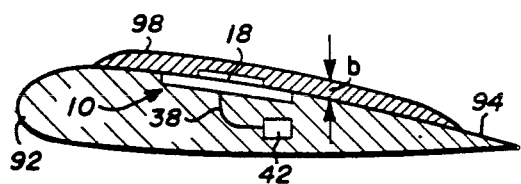
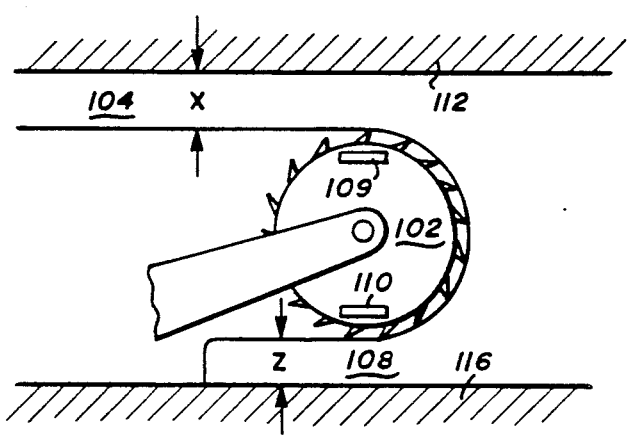
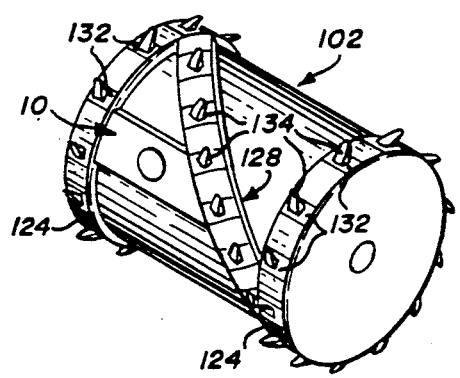

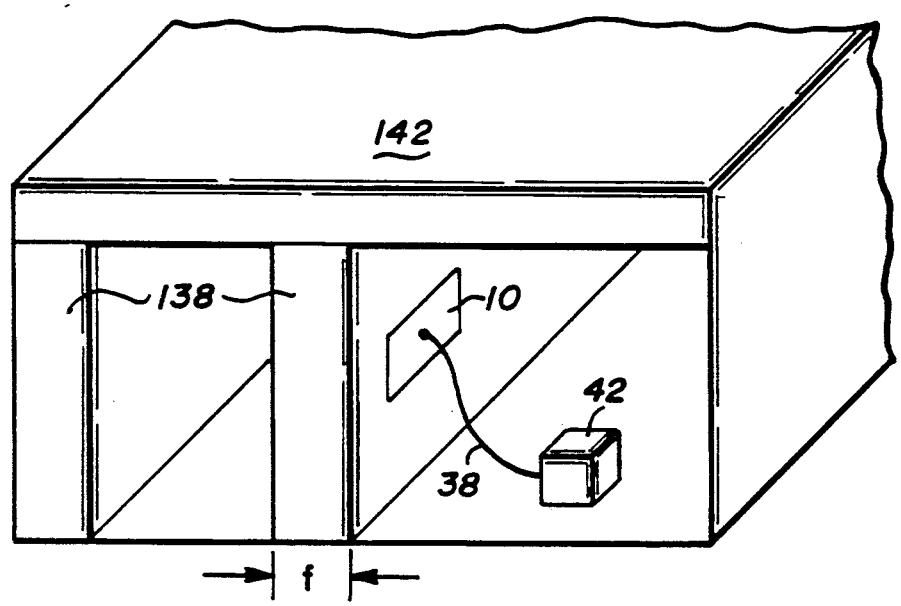
Fig_13
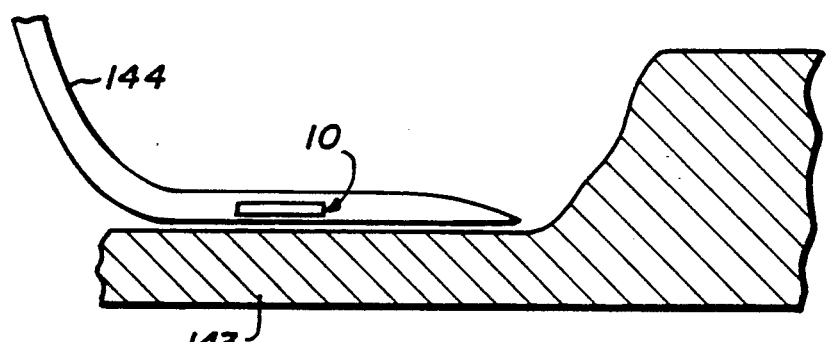
Fig_14
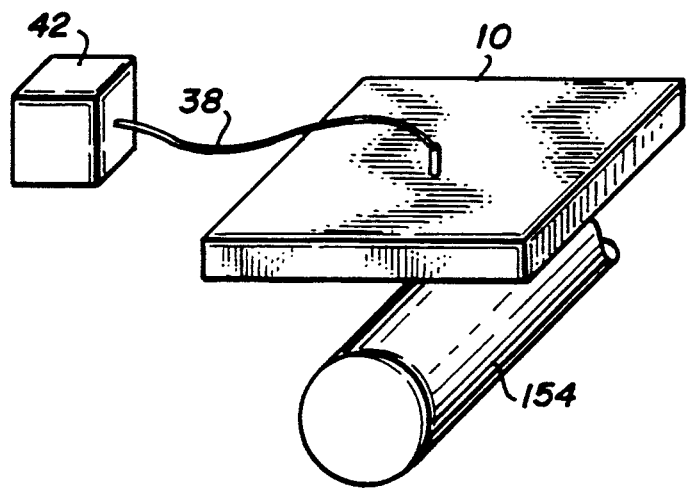
Fig_15

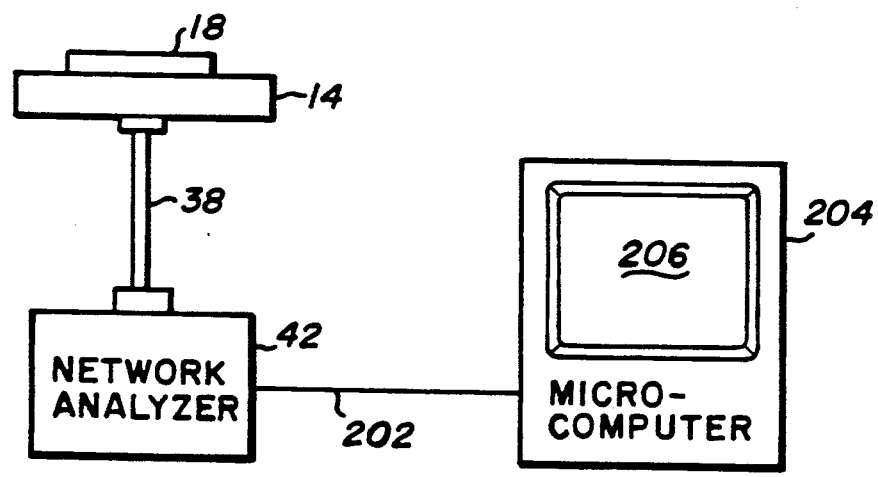
Fig_16

METHOD AND APPARATUS FOR MEASURING THE THICKNESS OF A LAYER OF GEOLOGIC MATERIAL USING A MICROSTRIP ANTENNA

BACKGROUND OF THE INVENTION

1. Field of the Invention

The invention relates generally to a method for measuring the thickness of a layer and more particularly to a method that correlates changes in input admittance or resonant frequency of a microstrip antenna with changes in the thickness or electrical properties of the layer.

2. Description of the Prior Art

The use, theory and structure of microstrip (patch) antennas is a well-documented field of technology. For example, the book "Microstrip Antenna Design" by K. C. Gupta and Abdelaziz Benalla, Artech House (1988) [hereinafter cited as Gupta and Benalla], is a compilation of approximately fifty-five previously published technical papers on the subject of microstrip antennas.

K. R. Carver and J. W. Mink, in *Microstrip Antenna Technology*, published in Gupta and Benalla, supra, at 13, disclose the construction of circular, rectangular and two-ear (bunny) patch antennas.

R. J. Mailloux et al, in *Microstrip Array Technology*, published in Gupta and Benalla, supra, at 36, disclose the use of a coaxial connector, positioned off-center, to ground and excite the patch antenna.

I. J. Bahl et al, in *Design of Microstrip Antennas Covered with a Dielectric Layer*, published in Gupta and Benalla, supra, at 345, discuss the effect of covering the microstrip antenna with a dielectric layer of material such as Duroid brand fluoropolymer.

V. Hansen et al, in *Input Impedance and Mutual Coupling of Rectangular Microstrip Patch Antennas with a Dielectric Cover*, published in Gupta and Benalla, supra, at 360, discuss the effect on input impedance of covering the patch antenna with a layer of ice.

The use of a shielded resonant horizontal loop antenna sensor for measuring the thickness of a coal layer is disclosed by Stolarczyk et al, in U.S. Pat. No. 4,753,484, issued June 28, 1988. D. Chang and J. Wait, in "An Analysis of a Resonant Loop as an Electromagnetic Sensor of Coal Seam Thickness," Proceedings of URSI Conference on Remote Sensing, LaBaule, France (Apr. 28-May 6, 1977), developed formulas for calculating the input admittance of a resonant loop antenna for variations in uncut coal layer thickness.

None of the prior art shows the use of a microstrip antenna in a method for measuring the thickness of a layer or for detecting objects concealed by the layer. Furthermore, loop antennas are subject to significant design limitations.

SUMMARY OF THE PRESENT INVENTION

It is therefore an object of the present invention to provide a method for measuring the thickness of a layer of inaccessible material that utilizes an antenna having flexible design characteristics.

It is another object of the present invention to provide a method for detecting the presence of objects covered by a layer of material that utilizes an antenna having flexible design characteristics.

It is another object of the present invention to provide a method for detecting the buildup of a layer of material that utilizes an antenna having flexible design characteristics.

Briefly, a preferred embodiment of the present invention comprises the method of utilizing a microstrip (patch) antenna sensor to measure electromagnetic scattering from a layer of material positioned adjacent to the patch antenna sensor. Electromagnetic scattering is produced at a boundary where the electrical parameters (magnetic permeability, dielectric constant and conductivity) of the layer of material change. By comparing the measured input conductance of the microstrip antenna to a predetermined set of calibration conduction values, the thickness of the layer can be determined by interpolation. Such a method is useful, for example, in measuring the thickness of a layer of coal during a coal mining procedure.

In an alternative procedure, the patch antenna sensor is swept over the layer of material of interest and areas where a change in input conductance of the patch antenna occurs are noted. Such a method is useful in detecting buried plastic or metal land mines.

In a third type of procedure, the patch antenna sensor is secured at a position and changes from a control conductance value are monitored. Such a method is useful in detecting the buildup of ice on the wings of an aircraft.

The patch antenna sensors are constructed by connecting the patch antenna to a ground plane. A substrate layer is positioned between the patch antenna and the ground plane. By using substrate materials that have high dielectric constants, low frequency signals can be utilized with reasonably sized patch antennas. In contrast, with loop antennas, the size of the loop increases in inverse proportion to the signal frequency being utilized. Thus, size considerations prevent the use of loop antennas in many situations. Additionally, the use of a thin, flexible substrate material allows patch antenna sensors to be mounted in a variety of unique situations such as on aircraft wings or on a coal cutting drum. Furthermore, patch antennas can be covered with a protective layer which allows the patch antenna sensor to be utilized in more hostile environments than is possible with loop antennas.

An advantage of the present invention is that microstrip antenna sensors that utilize a high dielectric substrate layer function at low frequencies while remaining small in size.

Another advantage of the present invention is that the flexibility of microstrip antenna sensors provides a method for measuring the thickness of a layer of material in inaccessible areas.

Another advantage of the present invention is that microstrip antenna sensors provide a method for detecting objects covered by a layer of material.

Another advantage of the present invention is that microstrip antenna sensors provide a method for detecting the buildup of a layer of material.

Another advantage of microstrip antenna sensors is that they can be covered with a protective covering.

These and other objects and advantages of the present invention will no doubt become obvious to those of ordinary skill in the art after having read the following detailed description of the preferred embodiment(s) which are illustrated in the various drawing figures.

IN THE DRAWINGS

FIG. 1 illustrates a perspective view of a microstrip sensor for use in practicing the method of the present invention;

FIG. 2 illustrates a side view of the microstrip sensor of FIG. 1;

FIG. 3 illustrates a top view of a microstrip antenna having two planar strips;

FIG. 4 illustrates a perspective view of a protective covering for placement around a microstrip sensor;

FIG. 5 illustrates a cross-sectional view of a two layer system and a microstrip sensor for measuring the thickness of the first layer;

FIG. 6 illustrates a representative calibration curve for use in the present invention;

FIG. 7 illustrates representative calibration curves showing conductance and resonant frequency versus layer thickness;

FIG. 8 illustrates a perspective view of a region of land containing a plastic land mine;

FIG. 9 illustrates a multiple microstrip antenna sensor;

FIG. 10 illustrates a cross-sectional view of an aircraft wing containing a microstrip sensor;

FIG. 11 illustrates a side view of a cutting drum containing a microstrip sensor;

FIG. 12 illustrates a perspective view of the cutting drum of FIG. 11;

FIG. 13 illustrates a perspective view of a coal rib in a coal mine; and

FIG. 14 illustrates the use of a microstrip sensor in measuring the uncut thickness of a coal layer in open-pit mining.

FIG. 15 illustrates a perspective view of a log being monitored by a microstrip sensor.

FIG. 16 illustrates an embodiment of the present invention which incorporates a typical microcomputer having a display.

DETAILED DESCRIPTION OF THE PREFERRED EMBODIMENT

FIG. 1 illustrates a perspective view of a microstrip layer sensor 10 comprising a substrate 14, a microstrip (patch) antenna 18 and a conductive ground plane 22. The substrate 14 is a rectangular piece of inert material, such as epoxy glass or fluorocarbon material, such as Teflon or Duroid brands, or other high dielectric material, and has a thickness "t" of less than 0.5 inches in the preferred embodiment. The substrate 14 may have other shapes such as a square or a circle. Antennas having the structure of the layer sensor 10 are well-known in the prior art as is shown by Carver and Mink, supra.

The antenna 18 is a self-resonant circular patch antenna having a diameter "d" that varies depending on the frequency at which the sensor 10 is operated and on the dielectric constant of the substrate 14. For example, at 850 MHz, and with a substrate 14 having a dielectric constant of 2.5, the resonance frequency requires that "d" be approximately 5 inches. At 165 MHz, and with a dielectric constant of 2.5, the resonance frequency requires that "d" be approximately 26 inches. With a dielectric constant of 1300, the 165 MHz resonance frequency requires that "d" be approximately three inches.

The antenna 18 is comprised of a solid, thin circular piece of conductive material such as silver or gold plated copper foil or electroplated copper. The antenna 18 may have other shapes such as squares or rectangles, but a circular shape yields the most sensitive antenna.

FIG. 2 illustrates a side view of the layer sensor 10 showing that a ground wire 26 grounds the geometric center of the microstrip antenna 18 to the ground plane 22. A center pin 30 of a coaxial cable connector 34 connects the antenna 18 to a coaxial cable 38. The coaxial cable 38 is connected to a network analyzer 42, such as a Hewlett-Packard 4191A impedance analyzer, for measuring parameters such as the admittance and resonant frequency of the antenna 18.

FIG. 3 illustrates a top view of a microstrip antenna 46 having a pair of planar strips 50. The planar strips 50 permit the antenna 46 to be operated at two frequencies.

FIG. 4 illustrates a layer sensor 54 comprised of the microstrip antenna 46 and other elements analogous to the elements of the layer sensor 10 (i.e. a conductive ground plane 22', a ground wire 26', a coaxial cable connector 34', a center pin 30' (not shown) and a substrate 14' (not shown). The layer sensor 54 is positioned in a rectangular recessed area 58 of a protective housing 62. A plurality of connectors 66, such as bolts, hold the layer sensor 54 within the protective housing 62 which is comprised of a sturdy dielectric material such as Tivar-88 brand plastic. Other types of microstrip antennas, such as the antenna 18, could be used in the sensor 54.

FIG. 5 schematically illustrates the general method of the present invention. The microstrip layer sensor 10 is positioned at a height "h" over a surface 64 of a first layer 66. The first layer 66 has a thickness "$d_1$" at a position "$P_1$". The height "h" could be zero. A second layer 70 is positioned at a distance $d_2$ from the surface 64.

At the position "$P_1$", the microstrip sensor 10 will register a first input conductance value. In general, the electrical parameters (i.e. conductivity, permittivity and magnetic permeability) of the first layer are constant throughout the first layer. Therefore at any position where the first layer has a constant depth (i.e. $d_1$), the conductance value measured by the layer sensor 10 is constant. When the second layer 70 is encountered, the depth of the first layer 66 effectively changes from "$d_1$", to "$d_2$" and a corresponding change in input conductance of the antenna 18 is detected by the layer sensor 10 and measured by the impedance analyzer 42.

A calibration curve 74 for a particular medium can be constructed by plotting input conductance values versus depth for the first layer 66 as is illustrated in FIG. 6. There is a conductance value $G_c$ about which the conductance G oscillates and towards which G converges at large thicknesses. By sweeping the layer sensor 10 over the first layer 66, and observing the measured conductance value at a plurality of the positions "P", the location of the second layer 70 can be deduced from a change in input conductance value. The distance to the second layer 70 can be determined by comparing the observed conductance value to the calibration curve. Alternatively, by comparing the input conductance value obtained at a particular position, e.g. "$P_1$", to the calibration curve 74, the depth "$d_1$" can be obtained by interpolation from the calibration curve 74. Such a comparison could be made manually by utilizing a graph such as FIG. 6 or electronically, for example, by storing the calibration curve 74 in a microcomputer 204. The conductance versus depth values that make up the calibration curve 74 are referred to as a table.

FIG. 7 illustrates that both the resonant frequency (rf) and the conductance (G) of the microstrip antenna 10 vary with the thickness of the first layer 66. Thus, either of the parameters rf or G can be utilized in determining the thickness of the first layer 66.

The functioning of the microstrip antenna 10 is thought to be as follows. When an operating frequency is applied to the microstrip antenna 18, a magnetic wall forms around the circumference of the antenna 18. An electric (E) field is forced to zero by the ground wire 26. The E field reaches a maximum on the circumference of the antenna 18. Fringing E fields are polarized between the antenna 18 and the ground plane 22. The fringing E fields cause magnetic current to flow around the circumference of the antenna 18. Parameters of the antenna 18, such as conductance and resonant frequency, are affected by the electrical properties (e.g. conductivity, permittivity and magnetic permeability) and thickness of the first layer 66, positioned in close proximity to the antenna 18. More specifically, the input admittance and resonant frequency change with the scattering produced at the boundary where the electrical properties of the first layer 66 change. Thus, when the electrical properties or the thickness of the first layer 66 change, this change is registered by the input admittance of the antenna 18. Conductance (G) is related to input admittance (Y) by equation (1).

$$Y = G + jB \qquad (1)$$

where
B = input susceptance; and
j = imaginary number.

Ideally, the microstrip sensor 10 is operated at the resonant frequency which is determined when B in equation (1) is zero. The resonant frequency decreases with increasing diameter of the antenna 18 and with increasing dielectric constant of the substrate 14.

FIG. 8 illustrates this process for use in the detection of a hidden nonmetallic (plastic) or metallic land mine 78, such as an anti-personnel or tank land mine, buried at a depth "$d_x$". An operator 82 sweeps the layer sensor 10 over a region 86, such as an area of soil. At a plurality of positions "P", the control conductance value "$G_c$" is registered by the layer sensor 10 because the region 86 has a uniform, large depth "$d_n$". However, when the land mine 78 is encountered at the position "P", a new conductance value "$G_n$" is registered by the layer sensor 10. At the position "$P_x$", the depth of the region 86 has essentially changed to the depth "$d_x$", thus yielding a new conductance reading. During a sweep, whenever the new conductance value "$G_n$" is registered, a decision must be made as to whether the value "$G_n$" indicates the presence of a mine 78. This is referred to as classifying the position as either containing or not containing a mine 78. The classification could be based, for example, on a comparison of "$G_n$" to a table of conductance values previously recorded for mines 78.

FIG. 9 illustrates a multiple microstrip antenna 87 having a first microstrip antenna 88 and a second microstrip antenna 89 positioned on a single substrate 14". The antenna 88 has a diameter "u" and the antenna 89 has a diameter "v" smaller than the diameter "u". A pair of coaxial cables 90 and 91 connect the antennas 88 and 89, respectively, to an impedance analyzer (not shown) and a ground plane 22" in the same manner that was utilized to connect the antenna 18 to the network analyzer 42 and the ground plane 22.

The utility of the multiple microstrip antenna 87 is that low frequency (larger diameter) microstrip antennas produce a greater response to larger diameter targets. Similarly, higher frequency microstrip antennas produce a greater response to smaller diameter targets. Since the diameter "u" is larger than the diameter "v", the resonant frequency of the antenna 88 is lower than the resonant frequency of the antenna 89. Therefore antenna 88 produces a better response to large diameter mines 78 whereas the antenna 89 produces a better response to small diameter mines 78.

FIG. 10 illustrates a cross-sectional view of an aircraft wing 92 having the layer sensor 10 along a wing surface 94. A layer of ice 98, having a thickness "b", has built up on the wing surface 94 and covers the layer sensor 10.

Under normal conditions, b=o (i.e. there is no ice layer 98) and the layer sensor 10 measures the conductance of the air surrounding the wing. However, if the ice layer 98 begins to build up on the wing surface 94, the sensor 10 will measure the conductance of the ice layer 98 which is significantly different than the conductance of air.

For example, in laboratory tests, the conductance of air, measured with a microstrip antenna, was 405 millisiemens (resonant frequency 873.2 MHz) while the conductance of a one-half inch layer of ice was 237 millisiemens (resonant frequency 956.3 MHz). Thus, the layer sensor 10 can be used to detect the build up of the ice layer 98.

FIG. 11 illustrates a cutting drum 102 on which the layer sensor 10 (not shown) has been mounted. The layer sensor 10 can be utilized to maintain a thickness "x" in a roof layer 104 and a thickness "z" in a floor layer 108 of coal as explained in U.S. Pat. No. 4,753,484. Measurements are taken when the layer sensor 10 is in an upper position 109 or a lower position 110.

The roof and floor layers 104 and 108 respectively could be any material with contrasting electrical parameters such as trona, potash, coal or gilsonite. The roof and floor layers 104 and 108 are generally bounded by a second layer 112 and a third layer 116, respectively, which are comprised of a rock like material.

FIG. 12 illustrates how the microstrip sensor 10 is mounted on the cutting drum 102. The cutting drum 102 is comprised of a pair of end vanes 124 and a cross vane 128. The vanes 124 and 128 include a plurality of bit blocks 132 and a plurality of cutting bits 134. The microstrip sensor 10 is welded between one of the end vanes 124 and the cross vane 128 so that the microstrip sensor 10 will be positioned parallel to the roof layer 104 and the floor layer 108 when the microstrip sensor 10 is in the positions 109 and 110 respectively.

In order to use the sensor 10, the sensor must be calibrated by taking measurements at various increments of coal thickness "x" or "z". To accomplish this calibration, the cutting drum 102 will cut vertically through roof layer 104 to the second layer 112, back off an incremental distance, advance longitudinally into roof layer 104 for a short distance and back off another incremental vertical distance from second layer 112. This procedure will be repeated with conductance measurements being made and stored for each thickness "x" or "z". This calibration provides a discrete set of allowable thicknesses "x" or "z" for which control will be possible.

Next, the operator selects the desired thickness "$t_D$" of coal to leave on the roof/floor from the set of allowed values. The cutting drum 102 must then be placed at a position corresponding to this thickness; this is accomplished by cutting into the second layer and backing off by the specified distance.

The cutting operation then begins. As the cutting drum 102 proceeds, the sensor 10 will monitor its position with respect to the second layer 112 by comparing current measurements with the stored calibration data. If the measurement is greater than the stored value for the specified thickness "$t_D$", a light will turn on indicating correction is necessary in a certain direction (up or down). If the measurement is less than the stored value, a light will turn on indicating correction is necessary in the opposite direction.

FIG. 13 illustrates how the microstrip sensor 10 is utilized to measure the thickness "f" of an uncut rib of coal 138. The thickness "f" is important because the rib 138 supports a roof layer 142. The thickness "f" is measured by the technique previously described with respect to FIG. 5. Specifically, the sensor 10 is positioned relative to the rib 138 and an antenna parameter such as input conductance or resonant frequency is measured. The measured value is then compared to a table of known values, for example input conductance versus rib thickness, and the rib thickness is deduced by interpolation.

FIG. 14 illustrates the use of a microstrip sensor 10 in measuring the uncut thickness of a coal layer 143 in open-pit mining. A bucket 144 of a coal loading machine (not shown) includes the sensor 10 to measure the thickness of the uncut layer 143.

FIG. 15 illustrates the use of the microstrip sensor 10 in distinguishing rotten or decayed wood from fresh cut wood. The microstrip sensor 10 is positioned relative to a log 154 and an antenna parameter such as input conductance or resonant frequency is measured. The measured parameter is then compared to a table of known values, for example input conductance versus wood condition (fresh or decayed). A decision is made as to the condition of the log 154 based on the comparison of the measured parameter to the table of known values. The decision could be made manually by a person or automatically, for example by a microcomputer. Such a method would be useful in an automated sawmill.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method of gathering data to be used in determining the unknown thickness of a first naturally-occurring layer of geologic material, comprising the steps of:
   a. selecting a type of geologic material to study;
   b. selecting a plurality of locations proximate to a body of a second naturally-occurring layer of geologic material having respective known thicknesses of said type of geologic material;
   c. positioning a first microstrip antenna relative to each of said locations such that the input conductance and resonant frequency of said microstrip antenna are substantially affected by said body; and
   d. measuring an empirical value of predetermined electrical parameters for said microstrip antenna while positioned in a consistent way at each of said locations, said electrical parameters comprising input conductance and/or resonant frequency.

2. The method of claim 1, further comprising the steps of:
   e. organizing said measured empirical values into a table such that the relationship of the various thicknesses of the selected type of geologic material are related to the corresponding measured values of said predetermined electrical parameter of said microstrip antenna.

3. A method for determining the unknown thicknesses of a first naturally-occurring layer of geologic material, comprising:
   a. selecting a type of geologic material to study;
   b. selecting a plurality of locations proximate to a body of a second naturally-occurring layer of geologic material having respective known thicknesses of said type of geologic material;
   c. positioning a first microstrip antenna relative to each of said locations such that the input conductance and resonant frequency of said microstrip antenna are substantially affected by said body;
   d. measuring an empirical value of predetermined electrical parameters for said microstrip antenna while positioned in a consistent way at each of said locations, said electrical parameters comprising input conductance and/or resonant frequency;
   e. organizing said measured empirical values into a table such that the relationship of the various thicknesses of the selected type of geologic material are related to the corresponding measured values of said predetermined electrical parameter of said microstrip antenna;
   f. positioning either said first microstrip antenna or a second microstrip antenna similar to said first microstrip antenna proximate to a layer of a known type of geologic material at a location where the thickness of said layer is unknown and such that the input conductance and resonant frequency of said positioned microstrip antenna are substantially affected by said body;
   g. measuring a value for said predetermined electrical parameter of said microstrip antenna positioned at said location; and
   h. indexing said table or plot with said measured value to fetch an estimate for the unknown thickness of said layer at said location.

4. The method of claim 3, further comprising the steps of:
   i. generating an X-Y plot of said table such that said known thicknesses of said type of geologic material from a first ordinate and said measured empirical values of said antenna form a second ordinate;
   j. interpolating values between points on said plot such that close approximations may be made for thicknesses of material not measured in step "d"; and
   k. extrapolating values outside points on said plot such that close approximations may be made for thicknesses of said type of geologic material not measured in step "d".

5. The method of claim 4, wherein:
said geologic material is coal in naturally-occurring strata of the Earth.

6. The method of claim 4, wherein:

said predetermined electrical parameter comprises either the input conductance or the resonant frequency of the respective microstrip antennas.

7. The method of claim 4, wherein:
said predetermined electrical parameter comprises both the input conductance and the resonant frequency of the respective microstrip antennas.

8. A method for determining the thickness of a first layer of geologic material beneath the surface of the Earth, comprising the steps of:
positioning a microstrip antenna relative to the first layer of a predetermined type of geologic material such that the input conductance and resonant frequency of said microstrip antenna are substantially affected by said body;
measuring a value for an electrical parameter of said microstrip antenna, said parameter comprising the input conductance and/or the resonant frequency of said microstrip antenna;
comparing said measured value to a calibration table or plot previously prepared from an empirical study of a second layer of geologic material wherein the thicknesses of the second layer were physically determined by independent means and said second layer comprises material equivalent to said first layer of geologic material; and
fetching, interpolating, and/or extrapolating, as appropriate, a result from said table or plot, such that an estimate of the thickness of the layer of geologic material is made for the location said measurement was taken.

9. The method of claim 8, wherein:
the positioning of said microstrip antenna is at a point above the surface of the Earth and said first layer of geologic material is a naturally-occurring strata of the Earth.

10. The method of claim 8, wherein:
the positioning of said microstrip antenna is at a point beneath the surface of the Earth and said first layer of geologic material is a naturally-occurring strata of the Earth proximate to said point.

11. The method of claim 10, wherein:
the positioning of said microstrip antenna is at a point within a mine shaft or cave such that said first layer of geologic material is substantially located laterally from said antenna.

12. The method of claim 10, wherein:
the positioning of said microstrip antenna is such that a means for mining said first layer of geologic material is guided within or to said layer of geologic material.

13. The method of claim 10, wherein:
the positioning of said microstrip antenna is controlled by a means for mining geologic material, such that said means for mining is guided within or to said first layer of geologic material.

14. A device for determining the unknown thickness of a layer of geologic material beneath the surface of the Earth, comprising:
means for positioning a microstrip antenna relative to a layer of a known type of geologic material of unknown thickness;
means for measuring a value for an electrical parameter of said microstrip antenna, said parameter comprising the input conductance and/or the resonant frequency of said microstrip antenna;
means for comparing said measured value to a calibration table or plot previously prepared from an empirical study of known thicknesses of material equivalent to said layer of geologic material;
means for fetching, interpolating, and/or extrapolating, as appropriate, a result from said table or plot, such that an estimate of the thickness of the layer of geologic material is made for the location said measurement was taken; and
means for communicating said estimate to a user.

15. The device as claimed in claim 14, wherein said means for comparing comprises a microcomputer.

16. The device as claimed in claim 14, wherein said means for fetching, interpolating and/or extrapolating comprises a microcomputer.

17. The device as claimed in claim 14, further comprising a protective housing disposed about said microstrip antenna.

* * * * *